(12) United States Patent
Burk

(10) Patent No.: US 7,404,107 B2
(45) Date of Patent: Jul. 22, 2008

(54) FAULT INJECTION SELECTION

(75) Inventor: Michael L. Burk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 11/011,603

(22) Filed: Dec. 15, 2004

(65) Prior Publication Data

US 2006/0143540 A1      Jun. 29, 2006

(51) Int. Cl.
    *G06F 11/00*      (2006.01)
(52) U.S. Cl. .......................................... 714/41
(58) Field of Classification Search ............... 714/41, 714/47, 25
    See application file for complete search history.

(56) References Cited

U.S. PATENT DOCUMENTS

| | | | |
|---|---|---|---|
| 5,307,498 A | 4/1994 | Eisen et al. | |
| 6,484,276 B1 * | 11/2002 | Singh et al. | 714/41 |
| 6,502,099 B1 | 12/2002 | Rampy | |
| 6,820,251 B1 | 11/2004 | Dwyer | |
| 6,971,048 B1 | 11/2005 | Hanson et al. | |
| 6,996,808 B1 | 2/2006 | Niewiadomski et al. | |
| 7,124,327 B2 * | 10/2006 | Bennett et al. | 714/38 |
| 7,200,525 B1 * | 4/2007 | Williams et al. | 702/185 |
| 7,225,428 B1 * | 5/2007 | Fetzer et al. | 717/124 |
| 2003/0204804 A1 | 10/2003 | Petri et al. | |
| 2004/0078683 A1 * | 4/2004 | Buia et al. | 714/37 |
| 2004/0243882 A1 | 12/2004 | Zhou | |

* cited by examiner

*Primary Examiner*—Nadeem Iqbal
(74) *Attorney, Agent, or Firm*—Shook, Hardy & Bacon L.L.P.

(57) ABSTRACT

A system and method for injecting faults are described. Faults may be injected into a process to determine if a given module handles the fault properly.

15 Claims, 8 Drawing Sheets

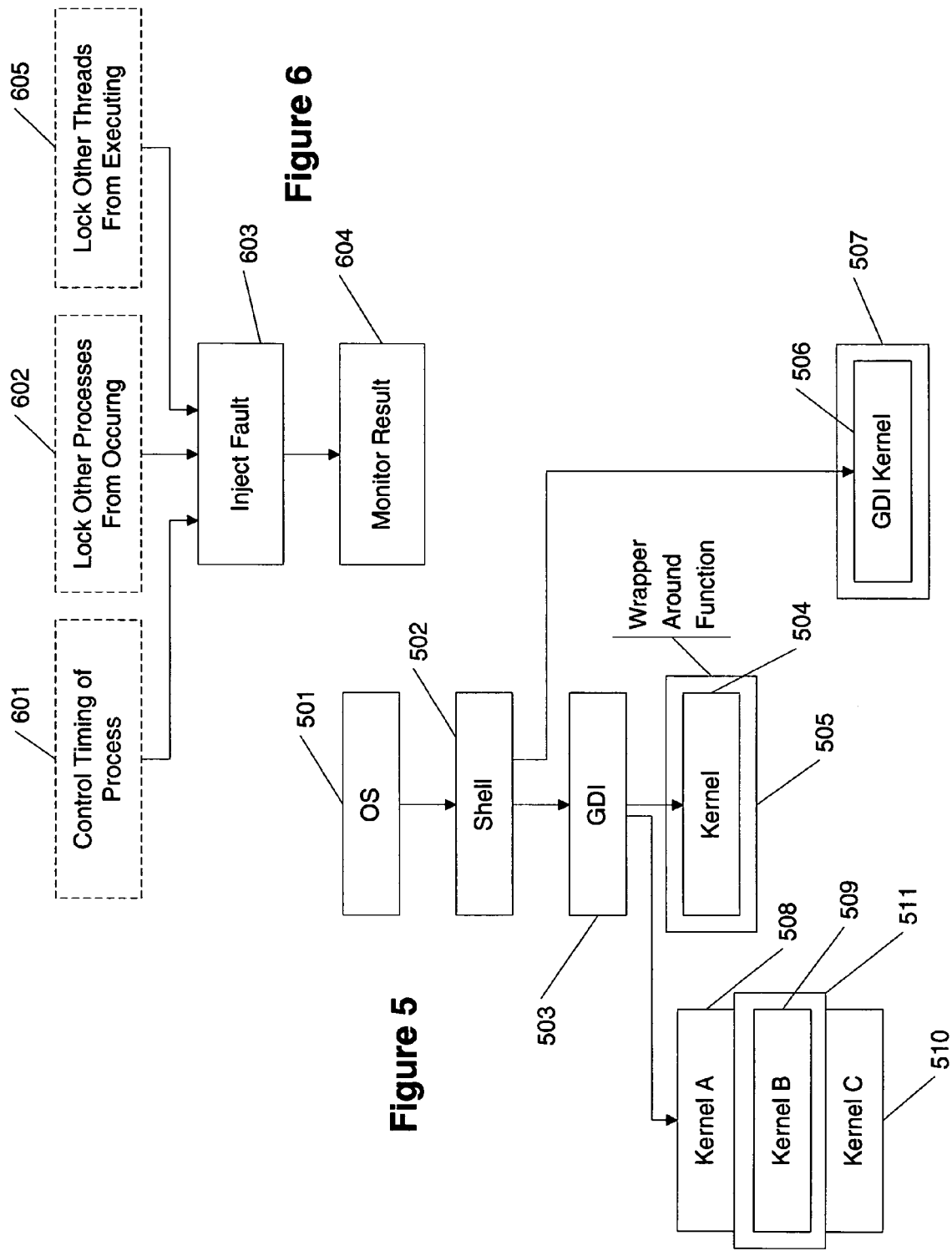

FAULT INJECTION SELECTION

BACKGROUND OF THE INVENTION

1. Field of the Invention

Aspects of the present invention relate to computer systems. More particularly, aspects of the present invention relate to testing of computer systems.

2. Description of Related Art

Computer system developers desire to release bug-free systems and/or applications. Be it hardware, software, or firmware, all computer products undergo some level of testing. Conventional testing systems allow test operators to specify a fault to occur and allow a system to encounter a fault. Often, identical processes may slightly differ in their execution based on environmental conditions. These alterations of the processes complicate testing procedures in that testing systems lack repeatability once a system error caused by the fault has been encountered.

FIG. 2 shows an example of a conventional testing process. In step 201, a user sets high-level testing conditions for a test to be run including a selection of a fault to occur. In step 202, a test is run. In step 203, the system reports a fault if, for example, a process attempted to access X, where X is a memory or an attempt to write or read from a drive, and the like. In step 204, the system monitors the results and reports and error if the system did not handle the fault properly. In general, conventional testing systems monitor application programming interface interactions and change return values according to a fault being created. Here, these systems allow a user to specify a percentage chance that a fault may occur (e.g., 90% of a memory fault to occur). The purpose of specifying the percentage fault is to allow some faults to occur later, thereby identifying processes that cannot handle the fault that would normally be shielded from receiving the fault because of the fault being handled previously. A difficulty with the system according to FIG. 2 is that the testing process does not consistently uncover fault handling problems that are buried deep in a call stack because the percentage fault specification may mean that a given process is repeatedly skipped. Similarly, one module may appropriately handle a fault, while masking another module's failure to handle the fault.

FIG. 3 shows an example of how a call stack may implement specified modules processes. Call stack 1 301 contain calls to various modules. Call stack 1 301 includes calls 304-310 that call modules 1 through 5 311-315 in the following order: 1, 3, 2, 1, 4, 1, and 5. A fault may be handled at call 304 while testing needed at calls 307 and 309 never occurs or occurs in an unpredictable pattern (because of the percentage fault chance described above).

A process for selectively initiating faults and for testing operating system functions is needed.

BRIEF SUMMARY OF THE INVENTION

Aspects of the present invention addressed one or more of the issues described above, thereby providing an improved testing method and system for developers.

BRIEF DESCRIPTION OF THE DRAWINGS

Aspects of the present invention are illustrated by way of example and not limited in the accompanying figures in which like reference numerals indicate similar elements.

FIG. 5 shows various levels where functions may be addressed in accordance with aspects of the present invention.

FIG. 6 shows alternative approaches to controlling fault injection in accordance with aspects of the present invention.

DETAILED DESCRIPTION OF THE INVENTION

Aspects of the present invention relate to injecting faults during testing phases.

The following description is separated into the following sections: general purpose computing environment; and fault injection.

General Purpose Computing Environment

Figure 1:
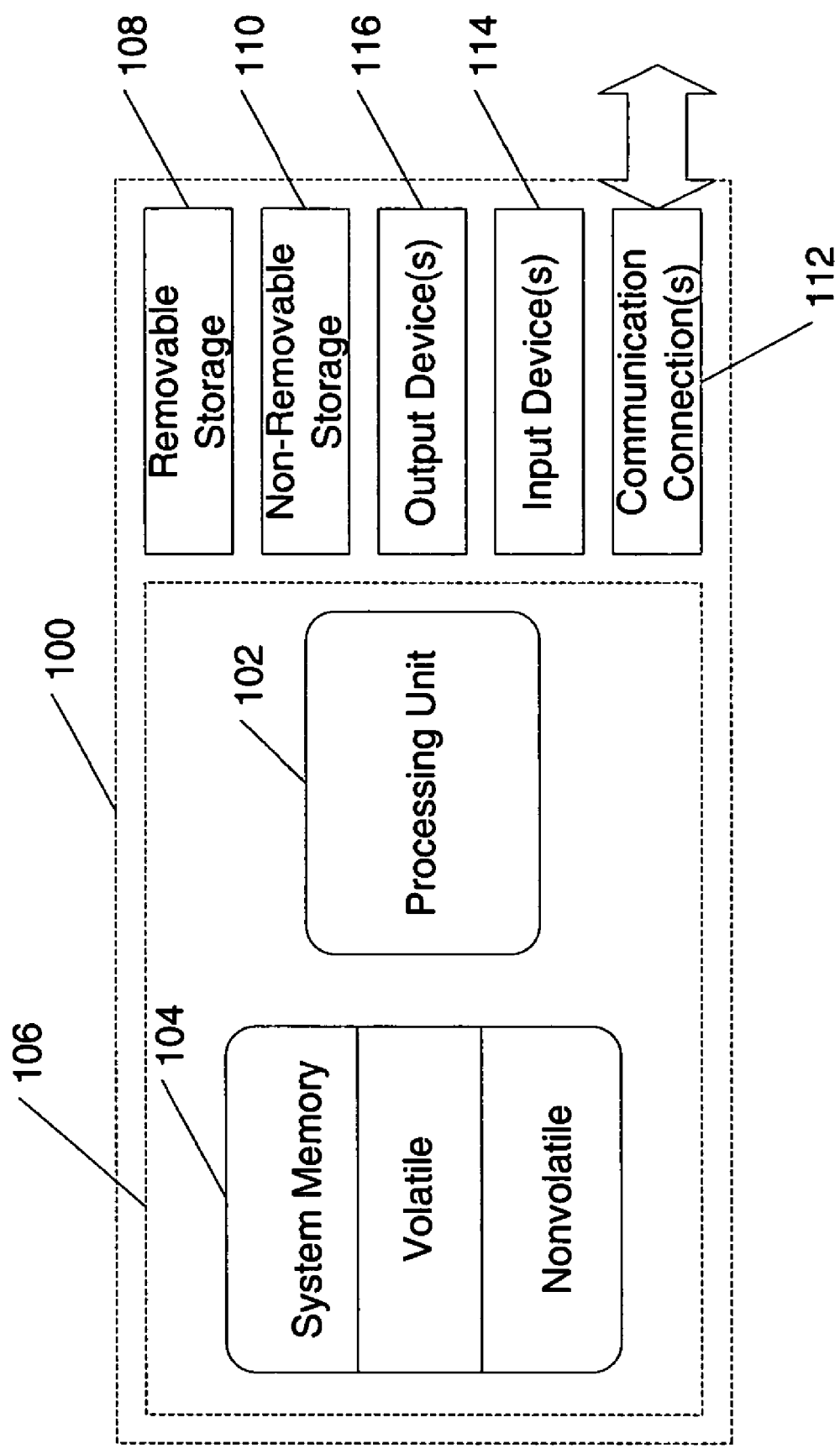
FIG. 1 shows a general-purpose computing environment in accordance with aspects of the present invention.
Figure 2:
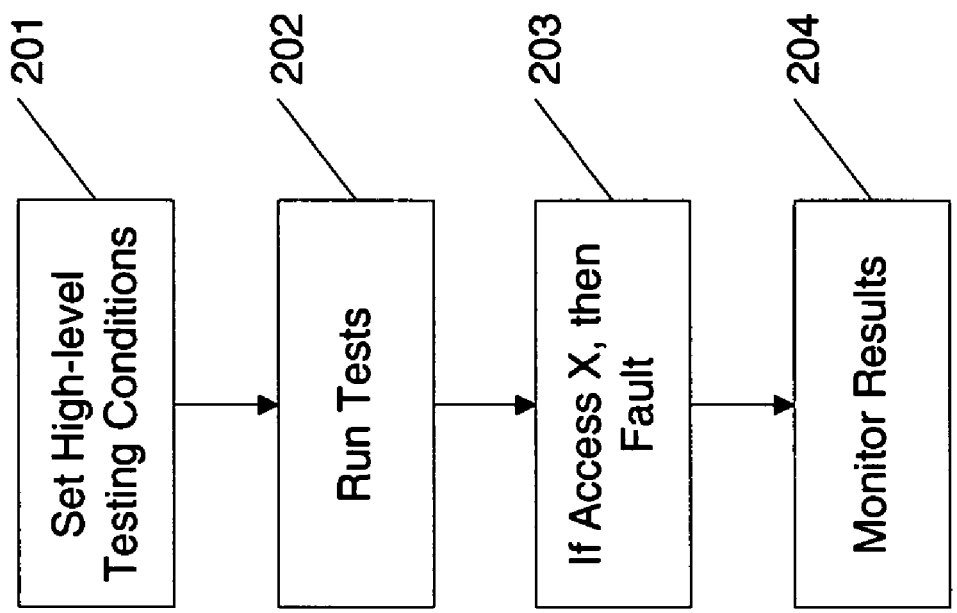
FIGS. 2-3 show conventional testing processes.
Figure 3:
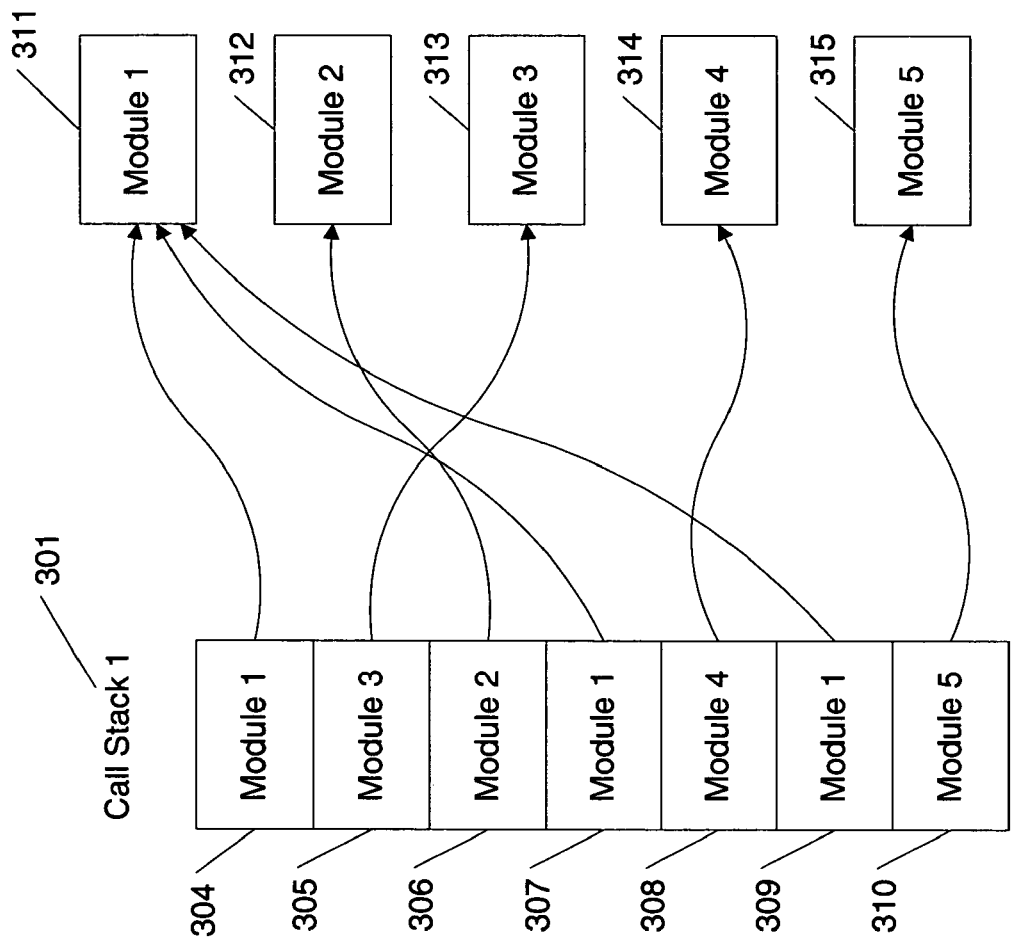

With reference to FIG. 1, an exemplary system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Automated and Manual Testing

Testing of computer systems can be a time-consuming and tedious process. Two types of testing exist: automated testing and manual testing. Automated testing requires the running of an application on a test machine. The test application and any dependencies have to be preconfigured on a test machine before the test is executed. These dependencies include files, environment variable settings, registry settings, and commands. There can be a significant number of dependencies, of which failing to enable one will jeopardize the validity of a test run.

Manual testing is another commonly used testing system. Manual testing includes having a user physically control a system to approach a desired condition and then monitoring the condition. For instance, this may include a game developer controlling a game to reach a desired point then evaluate performance or rendering of the game. Consistently being able to reach the same predefined location may be jeopardized by modifications to the environment, thereby making consistent testing difficult.

A modified version of automated and manual testing may also be used. Here, "semi-automated testing" may be used to automate some portion of the testing process (e.g. system configuration) that requires manual interaction.

In an additional aspect of the invention, the approach described herein may be used for more than fault injection alone. In particular, application compatibility or emulation modification may be tested. For example, aspects of the present invention allow a testing system to modify how responses are handled. These aspects allow a developer to change program interfaces (or behavior responses) without having to rewrite the actual code for a program. Here, for instance, one may automate gameplay to perform an action (for instance, walk forward, turn and look at a wall). Also, one may receive an instruction, partially complete the instruction, but return that the instruction was completed.

Fault Injection

Prior to public release of software, the software undergoes extensive testing. Because of the complexities of code, automated testing systems are used to accurately perform tests. These automated tests provide repeatability to provide testers the ability to determine if software modifications actually work.

Automated tests and good code coverage results require that conditions be repeatable and that error handling code be exercised. Aspects of the present invention provide a process for injecting a fault at a specific module or process to determine how the module or process responds to the fault injection.

Aspects of the present invention may include the use of COM objects to create relationships between elements. Objects may be implanted using other approaches as well.

Aspects of the present invention permit a user to identify a module or process and instruct a testing system to inject a fault for that module or process. For instance, one may use Detours by the Microsoft Corporation of Redmond, Wash., to intercept the execution of functions. Detours is a library for instrumenting arbitrary Win32 functions on x86 machines. Detours intercepts Win32 functions by re-writing target function images. Detours copy out first few bytes of a process and push the process to execute different code.

The system may also use files that relate source code with binary representations. For instance, Pilot Database (PDB) files created during compiling may be used to set up faults that may be used at any time and to trigger faults to occur in specific processing units, processes, or threads when desired. Aspects of the present invention allows the developer to specify the type of fault. For the specified fault, aspects of the present invention begin and end with a given function call within the binary being tested. In one embodiment, a COM object is created to achieve these and other advantages.

Adequate testing is important. Stress failures and system lockups can come from untested error handling routines. Rather than existing tools which let one set a random chance of a failure happening or for a failure to happen throughout a test, aspects of the present invention allow developers to target faults (or failures) to specific known times to more easily reproduce a problem and consistently verify the error handling code for increased reliability.

A second benefit of aspects of the invention is the ability to parse the files that relate source and binary code (e.g., PDB files) for binary, randomly read functions and be able to record what fault is injected in what function. For long-haul testing, this may allow developers to find functions that are missing required error handling code. Since the fault is known and the running of what function was in place at the time the fault was injected, one may address the problem and fix it.

Function hooks may be used that bracket functions with identifiable code. These function hooks allow a system to be cognizant when the specific code is executed. With the combined capabilities to compare the PDB files to function hooks, there is also the ability to inject exceptions at given points in time or to even make an internal call with the binary fail, rather than having to rely on only hooking external APIs as current fault injection packages do.

Since aspects of the present invention relate to hooking specific functions within binaries rather than APIs between binary dependencies, hooking at the lowest level functions in a dependency tree for creating the fault.

Most fault injection packages rest on top of the operating system's application programming interface calls making them more difficult for the operating system to use in testing itself.

Figure 4:
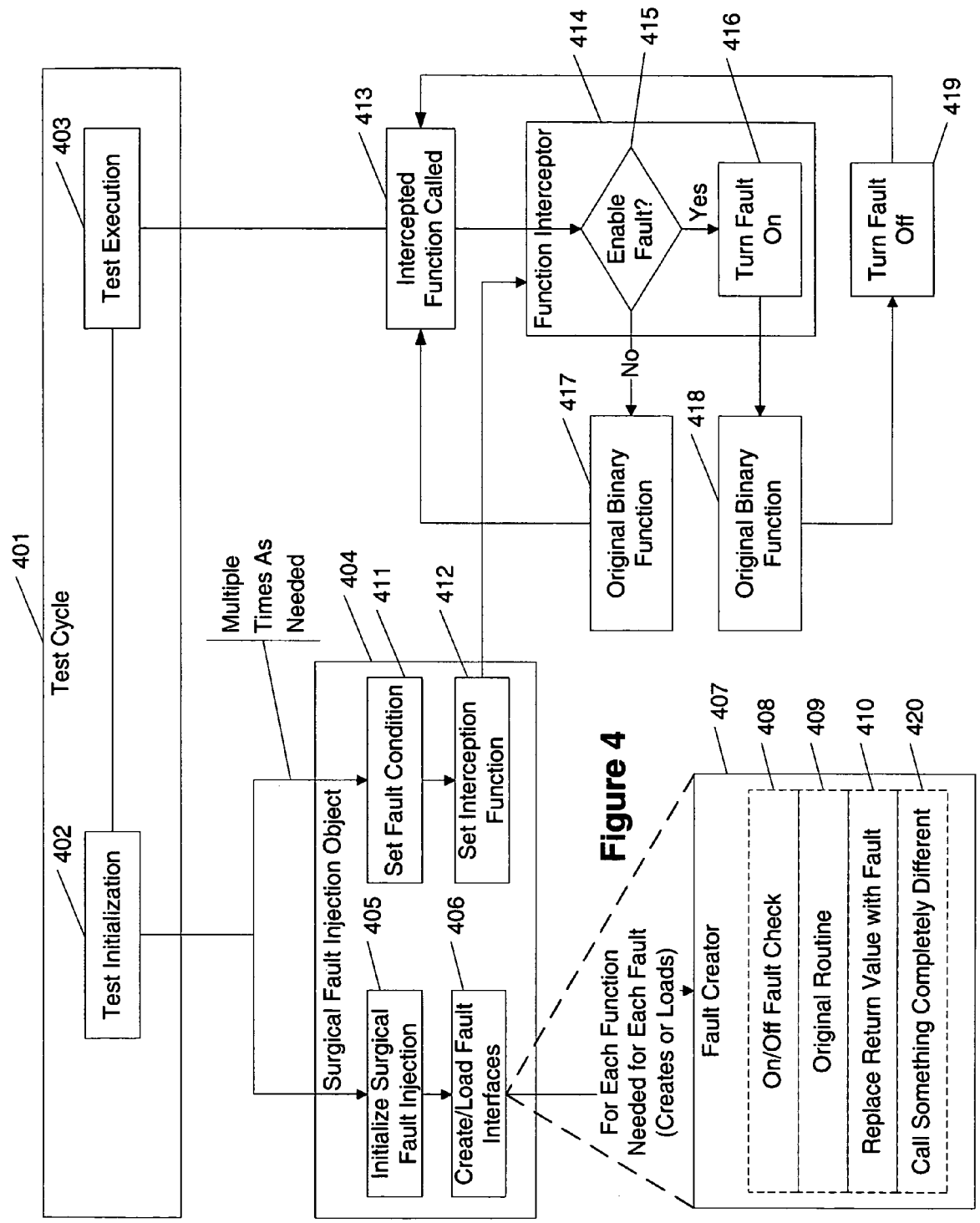
FIG. 4 shows a system in accordance with aspects of the present invention.

FIG. 4 shows an illustrative example of a system in accordance with aspects of the present invention. Test cycle 401 allows a developer to set up the testing process. For instance, the testing process may be manual or automatic. Test cycle 401 may also be referred to as an execution cycle when performing execution modifications but not testing (for instance, when emulating another system).

Test cycle 401 includes a test initialization process 402 and a test execution process 403. In the test initialization process, the system is configured to inject faults into a running process or processes. The test initialization process 402 uses a surgical fault injection object 404 to perform a number of items.

First, surgical fault injection object 404 initializes surgical fault injection in step 405. This initialization step defines what faults exist. For instance, running out of memory faults, insufficient writing/reading/erasing privileges, and the like are examples of types of faults that may be injected to one or more running processes. It is appreciated that any fault that is run in a testing procedure may be used.

In step 406, the system loads or creates fault interfaces. The fault interfaces are the relationships by which the faults are addressed.

For each function and for each fault, a fault creator object 407 exists. The fault creator object 407 includes the following: it determines if a fault has been turned off or turned on in step 408, it includes the original routine 409, replaces a normal return value with a desired fault 410, and/or calls something completely different 420. As shown in broken lines, the various responses are optional; other responses may be performed in place of or in addition to these responses as well. In short, the fault creator knows how it wraps an original routine to produce a fault.

Surgical fault injection object 404 includes a set fault condition step 411 that indicates the type fault condition to occur. In the set interception function step 412, the specific indication where the fault is to occur is provided.

Step 412 indicates which process or sub process is to be provided with a fault. The fault may trigger at the beginning of the process, the end of the process, randomly in the middle of the process or at the Nth execution of a function call. The fault may be triggered when a specific routine identifier is handled by a processor. Alternatively, a function call may be wrapped with a wrapper that redirects the execution of the function call to an alternate location. In short, step 412 specifies where a fault is to occur.

Test cycle 401 also includes test execution 403 process. Test execution process 403 includes step 413 that determines if a function to be intercepted has been called. If a selected function has been called, then a function interceptor 414 that has been instantiated by the set interception function step 412 is executed. In step 415, the process determines whether a fault for the intercepted function has been enabled. If no, from step 415, the system executes the binary function as originally provided in step 417 then returns to step 413 to wait for the next intercepted function. If yes from step 415, the fault is enabled in step 416, the binary function is performed with the fault enabled in step 418, and the fault is turned off in step 419. By this point, the execution of the binary function in step 418 may or may not have caused an error condition by the state of the fault. The occurrence and/or non-occurrence of the error condition may be logged for review.

FIG. 5 shows an illustrative example of how one may specify a specific function. An operating system 501 may call a shell 502, which then may call a graphical device interface 503, which may then call kernel 504. Here, kernel 504 has been wrapped with wrapper 505 to allow a system to determine when kernel 504 has been called. Further, in addition to wrapping a single procedure, one may wrap multiple procedures or layers. Additionally, one may specify specific branches in functions within a layer or the combination. For instance, one may wrap (507) GDI kernel 506. Also, one may wrap (511) kernel B 509 between kernels A 508 and C 510.

FIG. 6 shows an alternative approach to controlling processes when faults are injected. First, the system may specifically control the timing of processes and when they execute. For instance, one may specify that a process is to occur at a specific time in step 601. At the beginning of the process, during or at the end of the process, the fault may be injected in step 603. Finally, the result is monitored in step 604. The process of FIG. 5 relates to singular threads as well as multi-process hyperthreading and any method of executing more than one section of executable code at the same time.

Alternatively, in step 602, the system may lock other processes from occurring. In step 605, the system may lock other threads from executing. These locks provide the benefit of ensuring that no other processes or threads occur while the selected process is running.

Figure 7:
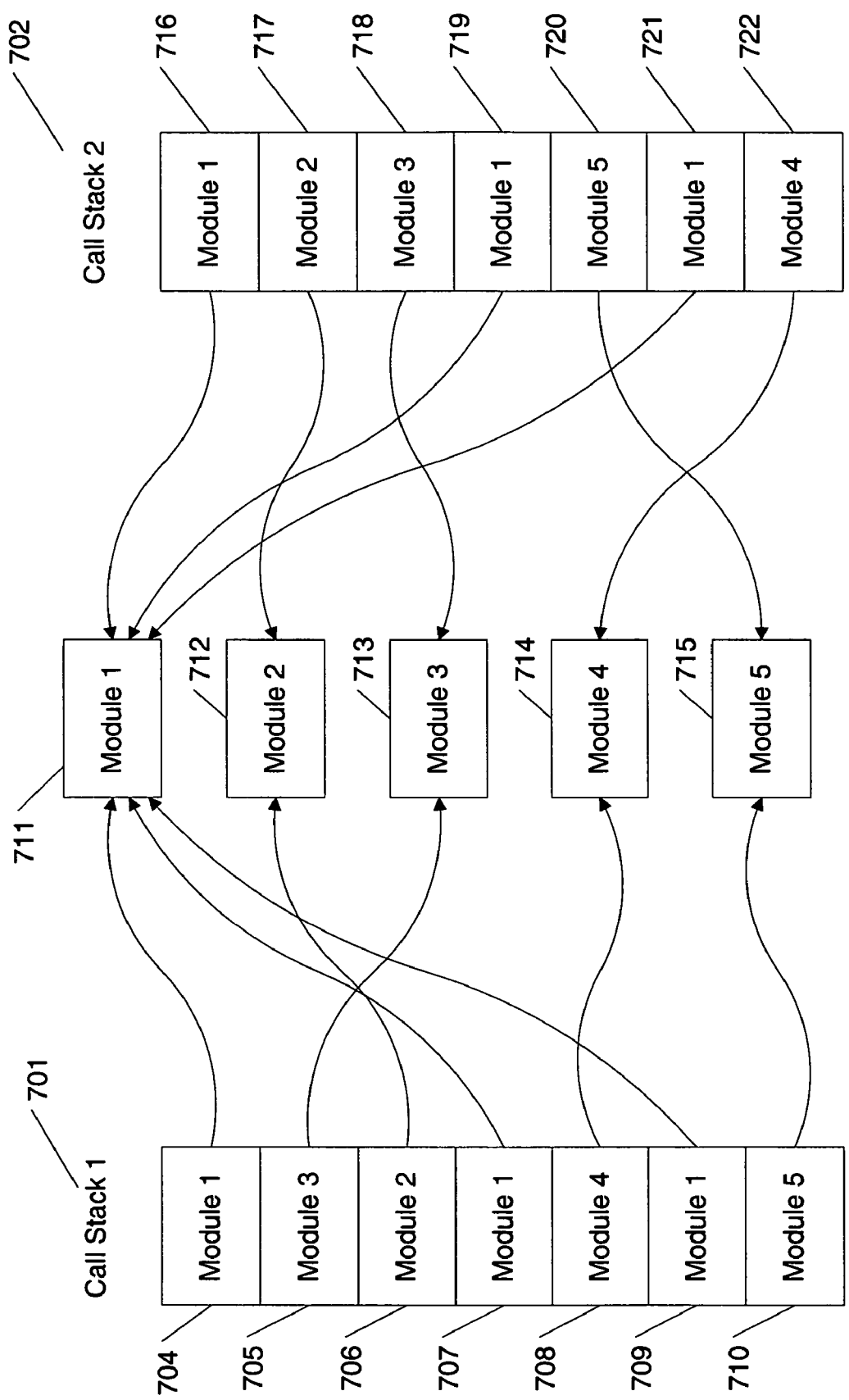
FIGS. 7 and 8 show multiple call stacks with different execution orders in accordance with aspects of the present invention.

FIG. 7 shows multiple stacks associated with common modules. Here, call stack 1 701 includes calls 704-710 (referencing modules 1-5 711-715) the call modules 1 through 5 in the following order: 1, 3, 2, 1, 4, 1 and 5. Call stack 2 702 includes calls 716-722 that call modules 1 through 5 in the following order: 1, 2, 3, 1, 5, 1, and 4. Here, in call stack 1 701, module 3 713 is called before module 2 712. Yet, in call stack 2 702, module 2 712 is called before module 3 718. Aspects of the present invention allow a call to a specific module to be wrapped and fault injected/alternative process performed. By handling specific calls, one may identify exactly where incorrect fault handling has occurred. Also, one may specifically alter an application's performance by handling specific calls as desired.

Figure 8:
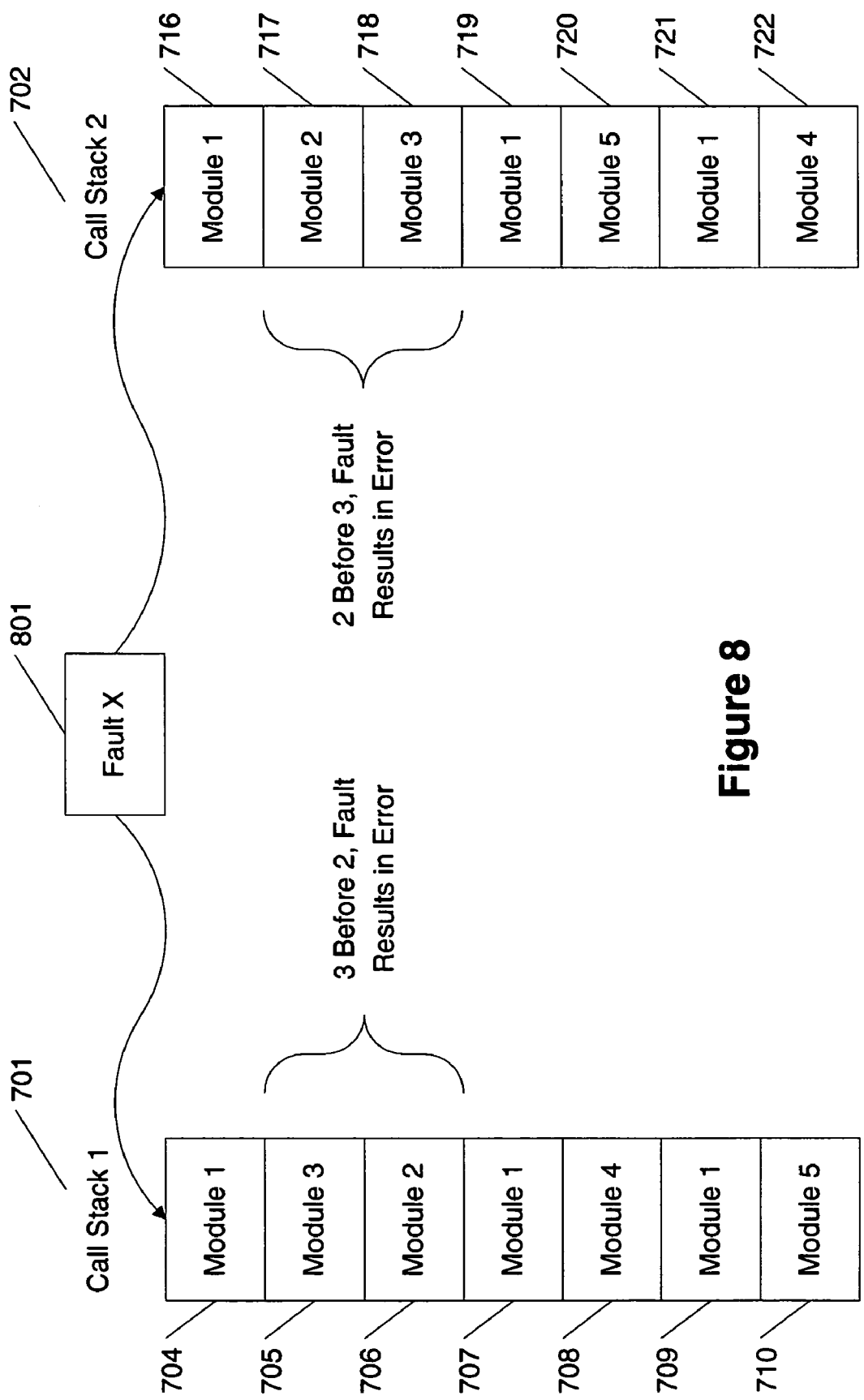

For example, FIG. 8 shows a process where the order of calls in a call stack modifies the results of a test. Prior systems would not have identified that module 2 does not properly deal with a fault X 401, for example, because this fault X 401 is eliminated by module 3. Prior system's execution of call stack 1 701 would not uncover this problem with module 2 because module 3 would have been called by call 705 ahead of call 706. In contrast, aspects of the present invention are able to operate on specific calls, thereby removing ambiguity whether a call is to be tested based on where it is in a call stack. In call stack 2 702, module 2 is called before module 3 by calls 717 and 718, respectively. The slight modification of the order of the execution of modules in various call stacks may have detrimental effects on previous testing systems but is handled properly by at least some aspects of the present invention.

Figure 9:
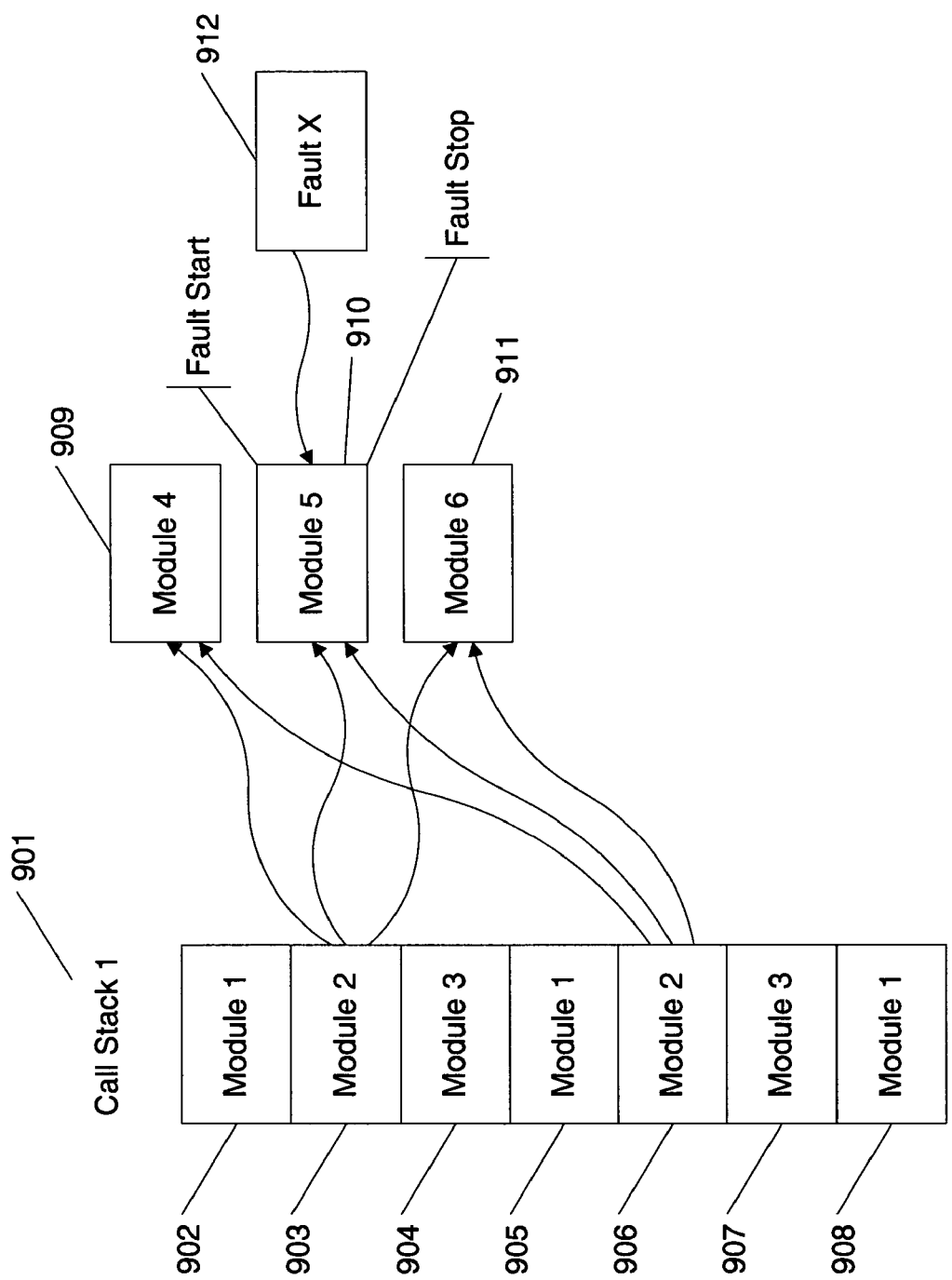
FIG. 9 shows fault injection at specific modules in accordance with aspects of the present invention.

FIG. 9 shows a fault being injected into multiple executions of a module. Here, call stack 1 901 includes calls 902-908 to modules 1-3 in the following order: 1, 2, 3, 1, 2, 3, and 1. Here, model 2 (at call locations 903 and 906) calls each of modules 4-6 909-911. The fault injection is occurring at module 5. In particular, fault X 912 is starting with the begging of the execution of module 5 910 and ending with the end of the execution of module 5. This example is testing only module 5 as called from module 2.

Alternative ways of detecting when faults are to be injected include specifying and monitoring interrupts and setting flags.

A pluggable interface may be provided so that a developer may add his own faults that may be feature specific or reside at a higher level than the low level kernel functions. Further, a given fault can be set to trigger during any random function call from a given PDB set with the fault, function, and runtime kicked out to a debugger log. A given exception can be thrown at any of the previous three conditions as well.

Aspects of the present invention may use exception handling techniques in additional to other techniques including processor interrupts.

Aspects of the present invention may be applied in various ways. Using the lower level hooks (wrappers for executing kernels), aspects of the present invention permit testing of higher level functions that access the wrapped kernels. Also, one may perform fault checks to ensure that all code in an application or operating system is being used. Finally, one may create function interceptors to wrap individual or group functions to better test applications and operating systems. In addition to wrapping a single kernel, one may wrap multiple kernels or layers. Additionally, one may specify specific branches in functions within a layer or the combination.

Aspects of the present invention have been described in terms of preferred and illustrative embodiments thereof. Numerous other embodiments, modifications and variations within the scope and spirit of the appended claims will occur to persons of ordinary skill in the art from a review of this disclosure.

I claim:

1. A process for establishing when faults are to be injected into a running function comprising the steps of:
    specifying a fault to occur;

determining a function to fault;
assigning a start location in said function where said fault is to start;
assigning a stop location in said function where said fault is to stop; and
designating said function to have operating priority over other functions during operation of said function.

2. The process according to claim 1, further comprising the step of:
designating said function to lock other functions from occurring during said function.

3. The process according to claim 1, further comprising the step of:
defining said fault to occur on an executable module.

4. A system for establishing when faults are to be injected into a running function comprising:
means for specifying a fault to occur;
means for determining a function to fault;
means for assigning a start location in said function where said fault is to start;
means for assigning a stop location in said function where said fault is to stop; and
means for designating said function to ha e operating priority over other functions during operation of said function.

5. The system according to claim 4, further comprising:
means for designating said function to lock other functions from occurring during said function.

6. The system according to claim 4, further comprising:
means for defining said fault to occur on an executable module.

7. A computer-readable storage medium having a program stored thereon, said program for establishing when faults are to be injected into a running function, said program comprising the steps of:
specifying a fault to occur;
determining a function to fault;
assigning a start location in said function where said fault is to start;
assigning a stop location in said function where said fault is to stop; and
designating said function to have operating priority over other functions during operation of said function.

8. The computer-readable storage medium according to claim 7, said program further comprising the steps of:
designating said function to lock other functions from occurring during said function.

9. The computer-readable storage medium according to claim 7, further comprising the step of:
defining said fault to occur on an executable module.

10. A process for establishing when faults are to be injected into a running function comprising the steps of:
initializing surgical fault injection;
loading fault interfaces;
setting one or more fault conditions;
setting one or more functions to be intercepted; and
designating said one or more functions to lock other functions from occurring during said one or more functions.

11. The process according to claim 10, further comprising the step of:
specifying a monitoring of a reaction of said function to said fault injection.

12. A system for establishing when faults are to be injected into a running function comprising:
means for initializing surgical fault injection;
means for loading fault interfaces;
means for setting one or more fault conditions;
means for setting one or more functions to be intercepted; and
means for designating said one or more functions to lock other functions from occurring during said or more functions.

13. The system according to claim 12, further comprising:
means for specifying a monitoring of a reaction of said function to said fault injection.

14. A computer-readable storage medium having a program stored thereon for establishing when faults are to be injected into a running function, said program comprising the steps of:
initializing surgical fault injection;
loading fault interfaces;
setting one or more fault conditions;
setting one or more functions to be intercepted; and
designating said one or more functions to lock other functions from occurring during said one or more functions.

15. The computer-readable storage medium according to claim 14, said program further comprising the step of:
specifying a monitoring of a reaction of said function to said fault injection.

* * * * *

UNITED STATES PATENT AND TRADEMARK OFFICE
CERTIFICATE OF CORRECTION

Page 1 of 1

PATENT NO. : 7,404,107 B2
APPLICATION NO. : 11/011603
DATED : July 22, 2008
INVENTOR(S) : Michael L. Burk It is certified that error appears in the above-identified patent and that said Letters Patent is hereby corrected as shown below:

In column 7, line 23, in Claim 4, delete "ha e" and insert -- have --, therefor.

In column 8, line 26, in Claim 12, after "said" insert -- one --.

Signed and Sealed this
Third Day of May, 2011

David J. Kappos
*Director of the United States Patent and Trademark Office*